United States Patent
Jones et al.

(10) Patent No.: US 7,590,388 B2
(45) Date of Patent: Sep. 15, 2009

(54) METHOD AND ARRANGEMENT FOR NOISE VARIANCE AND SIR ESTIMATION

(75) Inventors: Alan E. Jones, Wiltshire (GB); Nicholas W. Anderson, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 0 days.

(21) Appl. No.: 10/567,317

(22) PCT Filed: Aug. 5, 2004

(86) PCT No.: PCT/GB2004/003368
§ 371 (c)(1),
(2), (4) Date: Mar. 12, 2007

(87) PCT Pub. No.: WO2005/015790
PCT Pub. Date: Feb. 17, 2005

(65) Prior Publication Data
US 2007/0207741 A1 Sep. 6, 2007

(51) Int. Cl.
*H04B 1/00* (2006.01)
(52) U.S. Cl. .............. 455/67.13; 455/501; 455/506; 455/226.1; 455/232.1; 455/296
(58) Field of Classification Search .......... 455/501, 455/506, 226.1, 232.1, 296
See application file for complete search history.

(56) References Cited
U.S. PATENT DOCUMENTS

| | | | | |
|---|---|---|---|---|
| 5,214,675 A | * | 5/1993 | Mueller et al. | ............. 375/340 |
| 5,278,871 A | * | 1/1994 | Rasky et al. | ................ 375/343 |
| 5,343,496 A | * | 8/1994 | Honig et al. | ................ 370/342 |
| 5,351,274 A | * | 9/1994 | Chennakeshu et al. | ...... 375/347 |
| 5,406,593 A | * | 4/1995 | Chennakeshu et al. | ...... 375/376 |
| 5,566,165 A | * | 10/1996 | Sawahashi et al. | ......... 370/342 |
| 5,648,983 A | * | 7/1997 | Kostic et al. | ................ 375/150 |
| 5,802,446 A | * | 9/1998 | Giorgi et al. | .................. 455/69 |
| 5,987,069 A | * | 11/1999 | Furukawa et al. | .......... 375/285 |

(Continued)

FOREIGN PATENT DOCUMENTS

GB          2365282 A        2/2002

(Continued)

OTHER PUBLICATIONS

Great Britain Search Report mailed Jan. 9, 2004, for Great Britain Application No. 0318529.5 filed Aug. 7, 2003, 3 pages.

(Continued)

*Primary Examiner*—Duc Nguyen
*Assistant Examiner*—Hai V Nguyen
(74) *Attorney, Agent, or Firm*—Morrison & Foerster LLP

(57) ABSTRACT

A method and arrangement for noise variance and SIR estimation in a UTRAN Node B or User Equipment estimates the SIR ($SIR^{(l)}$ ... $SIR^{(K)}$) at the output of a detector by using an estimate ($\hat{\sigma}^2$) of the detector input noise variance to provide an estimate ($\hat{\sigma}_z^2$) of the detector output noise variance. The detector input noise variance is derived from a midamble portion in the received signal. By deriving the transfer function of the detector an estimate of the detector output noise variance is estimated. The estimated output noise variance then allows an improved estimate of the SIR ($SIR^{(l)}$ ... $SIR^{(K)}$) at the detected output.

32 Claims, 3 Drawing Sheets

U.S. PATENT DOCUMENTS

| | | | | |
|---|---|---|---|---|
| 6,078,796 | A * | 6/2000 | Ling | 455/234.1 |
| 6,157,820 | A * | 12/2000 | Sourour et al. | 455/226.2 |
| 6,167,039 | A * | 12/2000 | Karlsson et al. | 370/342 |
| 6,167,095 | A * | 12/2000 | Furukawa et al. | 375/285 |
| 6,181,739 | B1 * | 1/2001 | Ryde et al. | 375/227 |
| 6,292,519 | B1 * | 9/2001 | Popovic | 375/346 |
| 6,370,397 | B1 * | 4/2002 | Popovic et al. | 455/561 |
| 6,373,878 | B1 * | 4/2002 | Palenius et al. | 375/136 |
| 6,377,607 | B1 * | 4/2002 | Ling et al. | 375/130 |
| 6,408,023 | B1 * | 6/2002 | Abdesselem et al. | 375/232 |
| 6,408,189 | B1 * | 6/2002 | Nakamura et al. | 455/504 |
| 6,463,105 | B1 * | 10/2002 | Ramesh | 375/262 |
| 6,510,143 | B1 * | 1/2003 | Bejjani et al. | 370/320 |
| 6,539,214 | B1 * | 3/2003 | Lapaille et al. | 455/226.3 |
| 6,542,562 | B1 * | 4/2003 | Ostberg et al. | 375/350 |
| 6,707,864 | B2 * | 3/2004 | Kim | 375/343 |
| 6,731,622 | B1 * | 5/2004 | Frank et al. | 370/342 |
| 6,816,470 | B2 * | 11/2004 | Kim et al. | 370/280 |
| 6,882,619 | B1 * | 4/2005 | Gerakoulis | 370/209 |
| 6,891,897 | B1 * | 5/2005 | Bevan et al. | 375/265 |
| 6,928,102 | B2 * | 8/2005 | Zeira et al. | 375/130 |
| 6,956,888 | B2 * | 10/2005 | Zhengdi | 375/130 |
| 6,975,669 | B2 * | 12/2005 | Ling et al. | 375/141 |
| 6,980,602 | B1 * | 12/2005 | Kleinerman et al. | 375/262 |
| 6,996,160 | B2 * | 2/2006 | Li et al. | 375/148 |
| 6,996,385 | B2 * | 2/2006 | Messier et al. | 455/226.3 |
| 6,999,634 | B2 * | 2/2006 | Hong | 382/275 |
| 7,010,019 | B2 * | 3/2006 | Reial | 375/148 |
| 7,042,929 | B2 * | 5/2006 | Pan et al. | 375/148 |
| 7,042,967 | B2 * | 5/2006 | Reznik et al. | 375/346 |
| 7,054,300 | B2 * | 5/2006 | Pan et al. | 370/342 |
| 7,075,969 | B2 * | 7/2006 | Zeira et al. | 375/130 |
| 7,088,978 | B2 * | 8/2006 | Hui et al. | 455/296 |
| 7,092,431 | B2 * | 8/2006 | Maeda et al. | 375/144 |
| 7,151,761 | B1 * | 12/2006 | Palenius | 370/335 |
| 7,184,497 | B2 * | 2/2007 | Jeske et al. | 375/346 |
| 7,190,665 | B2 * | 3/2007 | Warke et al. | 370/201 |
| 7,228,146 | B2 * | 6/2007 | Banerjee | 455/522 |
| 7,277,474 | B2 * | 10/2007 | Sharma et al. | 375/148 |
| 7,283,790 | B2 * | 10/2007 | Chevalier et al. | 455/67.11 |
| 7,286,514 | B2 * | 10/2007 | Bar-Ness et al. | 370/338 |
| 7,313,172 | B2 * | 12/2007 | Pan et al. | 375/148 |
| 7,317,751 | B2 * | 1/2008 | Kyosti | 375/148 |
| 7,349,379 | B2 * | 3/2008 | Schmidl et al. | 370/342 |
| 7,349,463 | B1 * | 3/2008 | Pajukoski et al. | 375/148 |
| 7,349,667 | B2 * | 3/2008 | Magee et al. | 455/63.4 |
| 7,369,523 | B2 * | 5/2008 | Papasakellariou et al. | 370/328 |
| 7,372,402 | B2 * | 5/2008 | Numminen | 342/450 |
| 7,376,176 | B2 * | 5/2008 | Zhao et al. | 375/148 |
| 7,386,030 | B2 * | 6/2008 | Asghar et al. | 375/142 |
| 7,386,033 | B2 * | 6/2008 | Pan et al. | 375/147 |
| 7,386,057 | B2 * | 6/2008 | Ito et al. | 375/267 |
| 7,408,978 | B2 * | 8/2008 | Pan et al. | 375/150 |
| 7,411,997 | B2 * | 8/2008 | Umeno et al. | 375/150 |
| 7,428,270 | B1 * | 9/2008 | Dubuc et al. | 375/316 |
| 7,440,524 | B2 * | 10/2008 | Hwang et al. | 375/343 |
| 7,447,255 | B2 * | 11/2008 | De et al. | 375/147 |
| 7,453,933 | B2 * | 11/2008 | Jeske et al. | 375/227 |
| 7,457,379 | B2 * | 11/2008 | Yang et al. | 375/346 |
| 7,460,580 | B2 * | 12/2008 | Pan et al. | 375/141 |
| 7,474,640 | B2 * | 1/2009 | Doron et al. | 370/328 |
| 7,492,750 | B2 * | 2/2009 | Kim et al. | 370/342 |
| 7,492,837 | B2 * | 2/2009 | Tiirola et al. | 375/324 |
| 2002/0057730 | A1 * | 5/2002 | Karlsson et al. | 375/152 |
| 2002/0057735 | A1 | 5/2002 | Piirainen | |
| 2002/0097785 | A1 * | 7/2002 | Ling et al. | 375/147 |
| 2002/0136188 | A1 * | 9/2002 | Kim | 370/342 |
| 2003/0022626 | A1 * | 1/2003 | Miquel et al. | 455/24 |
| 2003/0026236 | A1 * | 2/2003 | De et al. | 370/342 |
| 2003/0026325 | A1 * | 2/2003 | De et al. | 375/147 |
| 2003/0043767 | A1 * | 3/2003 | Pan et al. | 370/335 |
| 2003/0078024 | A1 * | 4/2003 | Magee et al. | 455/296 |
| 2003/0081658 | A1 * | 5/2003 | Messier et al. | 375/147 |
| 2003/0086380 | A1 * | 5/2003 | Kim et al. | 370/280 |
| 2003/0104797 | A1 * | 6/2003 | Webster et al. | 455/296 |
| 2003/0198279 | A1 * | 10/2003 | Zeira et al. | 375/130 |
| 2003/0210667 | A1 * | 11/2003 | Zhengdi | 370/335 |
| 2003/0236080 | A1 * | 12/2003 | Kadous et al. | 455/226.1 |
| 2004/0032917 | A1 * | 2/2004 | Hwang et al. | 375/343 |
| 2004/0033791 | A1 * | 2/2004 | Schmidl et al. | 455/137 |
| 2004/0053592 | A1 * | 3/2004 | Reial | 455/303 |
| 2004/0102203 | A1 * | 5/2004 | Tiirola et al. | 455/515 |
| 2004/0120300 | A1 * | 6/2004 | Saquib | 370/342 |
| 2004/0131109 | A1 * | 7/2004 | Kim et al. | 375/148 |
| 2004/0146095 | A1 * | 7/2004 | Umeno et al. | 375/150 |
| 2004/0198296 | A1 * | 10/2004 | Hui et al. | 455/296 |
| 2004/0264591 | A1 * | 12/2004 | Malm et al. | 375/261 |
| 2004/0264604 | A1 * | 12/2004 | Malette et al. | 375/340 |
| 2005/0013350 | A1 * | 1/2005 | Coralli et al. | 375/148 |
| 2005/0084043 | A1 * | 4/2005 | Yang et al. | 375/346 |
| 2005/0094740 | A1 * | 5/2005 | Borran et al. | 375/267 |
| 2005/0102600 | A1 * | 5/2005 | Anandakumar | 714/755 |
| 2005/0141466 | A1 * | 6/2005 | Krupka | 370/338 |
| 2005/0181731 | A1 * | 8/2005 | Asghar et al. | 455/63.1 |
| 2005/0201499 | A1 * | 9/2005 | Jonsson | 375/348 |
| 2005/0265291 | A1 * | 12/2005 | Bar-Ness et al. | 370/335 |
| 2005/0286406 | A1 * | 12/2005 | Jeon et al. | 370/208 |
| 2006/0007895 | A1 * | 1/2006 | Coralli et al. | 370/335 |
| 2006/0012518 | A1 * | 1/2006 | Numminen | 342/360 |
| 2006/0023636 | A1 * | 2/2006 | Farhang-Boroujeny et al. | 370/252 |
| 2006/0089559 | A1 * | 4/2006 | Barbieri et al. | 600/509 |
| 2006/0126761 | A1 * | 6/2006 | Bernhardsson et al. | 375/340 |
| 2006/0135101 | A1 * | 6/2006 | Binshtok et al. | 455/232.1 |
| 2006/0146763 | A1 * | 7/2006 | Supplee et al. | 370/335 |
| 2006/0171418 | A1 * | 8/2006 | Casini et al. | 370/474 |
| 2006/0233223 | A1 * | 10/2006 | Pan et al. | 375/147 |
| 2007/0040704 | A1 * | 2/2007 | Smee et al. | 340/981 |
| 2007/0041428 | A1 * | 2/2007 | Wang et al. | 375/146 |
| 2007/0076643 | A1 * | 4/2007 | Yang et al. | 370/310 |
| 2007/0286292 | A1 * | 12/2007 | Moelker et al. | 375/241 |
| 2007/0291641 | A1 * | 12/2007 | Pan et al. | 370/210 |
| 2008/0062860 | A1 * | 3/2008 | Kwak et al. | 370/210 |
| 2008/0095216 | A1 * | 4/2008 | Pan et al. | 375/148 |

FOREIGN PATENT DOCUMENTS

| | | |
|---|---|---|
| GB | 2382748 | 4/2003 |
| GB | 2404822 A | 9/2005 |

OTHER PUBLICATIONS

International Search Report and Written Opinion mailed Nov. 22, 2004, for PCT Application No. PCT/GB2004/003368 filed Aug. 5, 2004, 12 pages.

Klein et al., (May 1996) "Zero Forcing and Minimum Mean-Square-Error Equalization for Multiuser Detection in Code-Division Multiple-Access Channels," *IEEE Transactions VT*, 45(2):276-287.

"3rd Generation Partnership Project; Technical Specification Group Radio Access Network; UTRAN Overall Description (Release 6)," (Dec. 2006). 3GPP:Valbonne, France, TS 25.401 v6.9.0.1-48.

"3rd Generation Partnership Project; Technical Specification Group Services and System Aspects; General Packet Radio Service (GPRS); Service Description; Stage 2 (Release 6)," (Dec. 2006). 3GPP:Valbonne, France, TS 23.060 v6.15.0:1-209.

Papoulis, A. (1991). Probability, Random Variables and Stochastic Processes. McGraw-Hill, Inc., 3rd edition, 6 pages (Table of Contents).

* cited by examiner

METHOD AND ARRANGEMENT FOR NOISE VARIANCE AND SIR ESTIMATION

CROSS REFERENCE TO RELATED APPLICATION

This application is U.S. National Stage entry under 35 U.S.C. § 371 of PCT International Application Ser. No. PCT/GB2004/003368 (International Publication No. WO 2005/015790 A1 and titled "Method and arrangement for noise variance and SIR estimation") filed on Aug. 5, 2004, which claims benefit of UK Patent Application No. GB 0318529.5 (UK Publication No. GB 2 404 882 A and titled "Method and arrangement for noise variance and SIR estimation") filed on Aug. 7, 2003, both from applicant IPWireless and both of which are incorporated herein by reference in their entirety.

FIELD OF THE INVENTION

This invention relates to noise variance and signal/interference ratio (SIR) estimation, and particularly though not exclusively to such estimation in wireless communication receivers. It will be understood that, as used herein, the terms 'noise' and 'interference' are to be considered synonymous, with each encompassing both noise and interference.

BACKGROUND OF THE INVENTION

In the field of this invention it is known that many parts of a wireless communications receiver often require an estimation of noise variance and/or SIR. This is needed for purposes of power control, threshold determination for various algorithms, quantisation of soft-decision information for channel decoding purposes to name but a few.

For BPSK (Binary Phase Shift Key) and QPSK (Quadrature Phase Shift Key) modulation the conventional method for estimating the SIR at the output of a detector relies on estimating output noise variance using the following equality known (for example) from the publication by Papoulis and Pillai, entitled 'Probability, Random Variables and Stochastic Processes', 3rd Ed. 1991, $$\hat{\sigma}_z^2 = E(|\hat{d}_n^{(k)}|^2) - E(|\hat{d}_n^{(k)}|)^2$$

where $\hat{\sigma}_z^2$ represents variance, E represents mean value and $\hat{d}_n^{(k)}$ the detector output.

This yields the following result:

$$SIR^{(k)} = \frac{P^{(k)} - \hat{\sigma}_z^2}{\hat{\sigma}_z^2} = \frac{E(|\hat{d}_n^{(k)}|)^2}{E(|\hat{d}_n^{(k)}|^2) - E(|\hat{d}_n^{(k)}|)^2}$$

where SIR represents the SIR of the $k^{th}$ sequence at the detector output, and $P^{(k)}$ represents the average power of the $k^{th}$ sequence at the detector output.

However, this approach has the disadvantage(s) that the accuracy of this method at low SIR is poor since it suffers from a bias term. An analysis of the bias term and a correction method has been suggested in UK Patent Application GB 0128475.1 (UK Publication No. GB 2 382 748 A and titled "Signal to noise plus interference ration (SNIR) estimation with correction factor" to applicant IPWireless) filed on Nov. 28, 2001. However, the suggested correction method requires a look-up table to correct for the aforementioned problem, and the estimation variance is also increased when correcting the bias.

A need therefore exists for a method and arrangement for noise variance and SIR estimation wherein the abovementioned disadvantage(s) may be alleviated.

SUMMARY OF INVENTION

In accordance with embodiments of the present invention there is provided a method for noise variance estimation, user equipment, base station, computer program product, communication system and an integrated circuit as claimed.

In some embodiments, the second noise variance signal is produced by applying to the first noise variance signal a function substantially equal to the detector's transfer function.

In some embodiments, the first noise variance signal is derived from a midamble portion of the received signal.

In some embodiments, an estimate of total power at the detector output is produced from the second noise variance signal and an SIR signal representative of SIR in the received signal.

BRIEF DESCRIPTION OF THE DRAWINGS

One method and arrangement for noise variance and SIR estimation incorporating the present invention will now be described, by way of example only, with reference to the accompanying drawings, in which.

DESCRIPTION OF PREFERRED EMBODIMENT(S)

Figure 1:
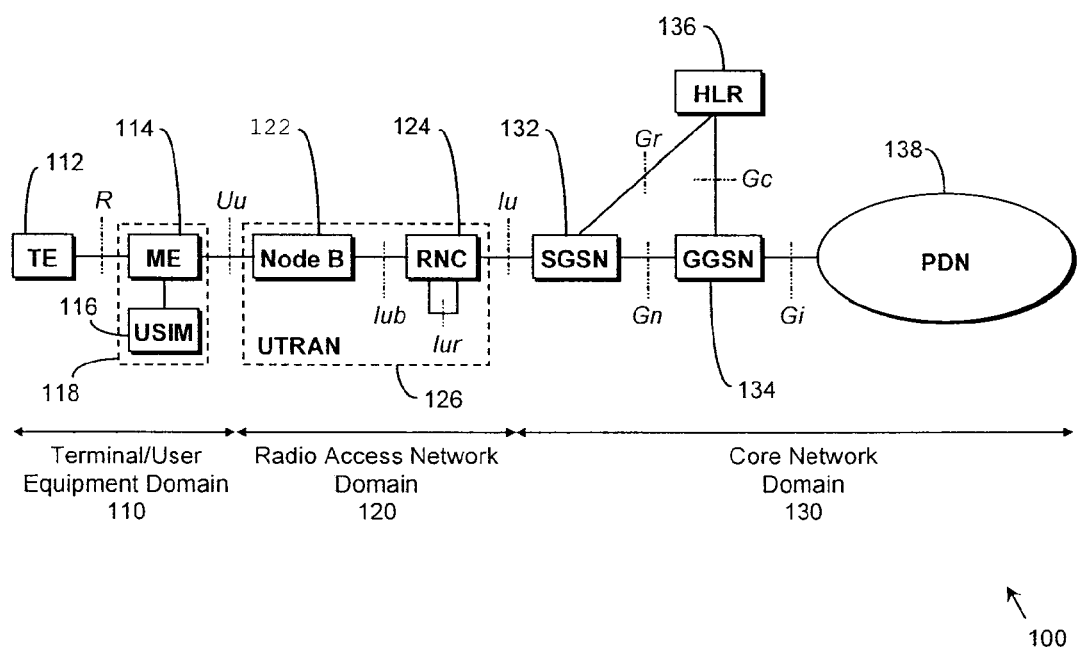
FIG. 1 shows a block schematic diagram illustrating a 3GPP radio communication system in which the present invention may be used.

The following preferred embodiment of the present invention will be described in the context of a 3GPP ($3^{rd}$ Generation Partnership Project) UMTS (Universal Mobile Telecommunication System) Radio Access Network (UTRAN) system operating in TDD mode. Referring firstly to FIG. 1, a typical, standard UTRAN system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain 120 via the wireless Uu interface. Within the radio access network domain 120, the Node B 122 communicates with a radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Figure 2:
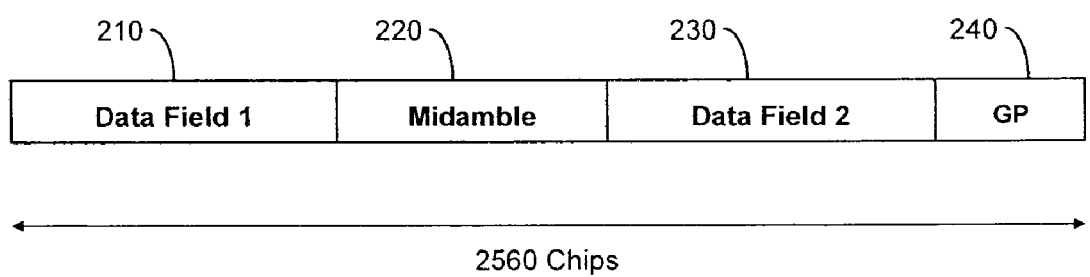
FIG. 2 shows a block schematic diagram illustrating a generic burst structure employed in the system of FIG. 1.

Thus, the elements RNC 124, SGSN 132 and GGSN 134 are conventionally provided as discrete and separate units (on their own respective software/hardware platforms) divided across the radio access network domain 120 and the core network domain 130, as shown the FIG. 2.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other via the Iur interface.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website, and need not be described in more detail herein.

The physical layer of UTRA TDD mode provides physical channels that carry transport channels from the MAC (Medium Access Control) sub-layer of UMTS Layer 2. A physical channel is defined by frequency, timeslot, channelisation code, burst type, and radio frame allocation. In UMTS Layer 2, in each time slot, three burst structures (as shown generically in FIG. 2) can be supported, each consisting of two data fields (210, 230), a midamble (220) and a guard period (240).

The data fields contain the data symbols from the transport channels, after the processes of coding, multiplexing, interleaving, and modulation. The midamble field contains the training sequence, which is used in a number of Layer 1 algorithms, such as channel estimation. The guard period, GP, is used to accommodate any timing inaccuracies, from propagation delays, channel dispersion, and power ramping in the transmitter. The different burst types and their associated field lengths in chips are given in the table below:

| Burst Type | Data Field 1 | Data Field 2 | Midamble $L_m$ | GP |
|---|---|---|---|---|
| Burst Type 1 | 976 | 976 | 512 | 96 |
| Burst Type 2 | 1104 | 1104 | 256 | 96 |
| Burst Type 3 | 976 | 880 | 512 | 192 |

The received sequence in the data payload areas of the burst is given by $$e = Ad + n$$

where $$d = (d^{(1)T}, d^{(2)T}, \ldots, d^{(K)T})^T = (d_1, d_2, \ldots, d_{KN})^T,$$

$(.)^T$ denotes transposition, K is the number of data sequences $k=1, \ldots, K$, and N is the number of symbols per data sequence $n=1, \ldots, N$. The data sequence for the $k^{th}$ user is given by $d^{(k)} = (d_1^{(k)}, d_2^{(k)}, \ldots, d_N^{(k)})^T$. The noise sequence n, denoted by $n=(n_1, n_2, \ldots, n_{NQ+W-1})^T$, has zero mean and covariance matrix $R_n = E(nn^H)$, where $(.)^H$ denotes conjugate transposition. The matrix has dimensions $(NQ+W-1) \times KN$ and the elements are given by:

$$A_{Q(n-1)+l, N(k-1)+n} = \begin{cases} b^{(k)} & k=1\ldots K, l=1\ldots Q+W-1, n=1\ldots N \\ 0 & \text{else} \end{cases}$$

where $b^{(k)} = h^{(k)} * c^{(k)}$, $h^{(k)}$ is the impulse response of the $k^{th}$ user, W is the length of the channel impulse response, * denotes discrete time convolution, $c^{(k)}$ is the spreading code of the $k^{th}$ user and Q is the length of the spreading sequence in chips.

The output of the detector is given by $$\hat{d} = f(e) = r + z$$

where f(.) denotes the transfer function of the detector, the vector r contains the desired symbols, and the vector z contains noise plus interference. The average power for the $k^{th}$ sequence at the output of the detector is given by $$p^{(k)} = E(|\hat{d}_n^{(k)}|^2)$$

Expanding $p^{(k)}$ produces $$p^{(k)} = E(|r_{n+(k-1)Q}|^2) + E(r_{n+(k-1)Q} z^*_{n+(k-1)Q}) + E(r^*_{n+(k-1)Q} z_{n+(k-1)Q}) + E(|z_{n+(k-1)Q}|^2)$$

Under the assumption that the noise is uncorrelated with the signal vector r, the average power for the $k^{th}$ sequence becomes $$p^{(k)} = E(|r_{n+(k-1)Q}|^2) + \sigma_z^2$$

where E(.) is the statistical average, $\sigma_z^2 = E(|z_{n+(k-1)Q}|^2)$ is the noise variance at the output of the detector, and $E(|r_{n+(k-1)Q}|^2)$ is the signal power for the $k^{th}$ sequence. The SIR at the output of the detector for the $k^{th}$ sequence is therefore given by $$SIR^{(k)} = \frac{P^{(k)} - \sigma_z^2}{\sigma_z^2} = \frac{E(|r_{n+(k-1)Q}|)}{\sigma_z^2}$$

The conventional method for estimating the SIR relies on estimating the detector output noise variance using the following equality mentioned above:

$$\hat{\sigma}_s^2 = E(|\hat{d}_n^{(k)}|^2) - E(|\hat{d}_n^{(k)}|)^2$$

to yield the following result:

$$SIR^{(k)} = \frac{P^{(k)} - \hat{\sigma}_z^2}{\hat{\sigma}_z^2} = \frac{E(|\hat{d}_n^{(k)}|)^2}{E(|\hat{d}_n^{(k)}|)^2 - E(|\hat{d}_n^{(k)}|)^2}$$

As discussed above, the accuracy of this approach at low SIR is poor since it suffers from a bias term, which may be corrected by use of a look-up table.

As will be discussed in greater, detail below, the following preferred embodiments of the present invention do not suffer from such a bias term and therefore do not require a look-up table to correct for the aforementioned problem.

Figure 3:
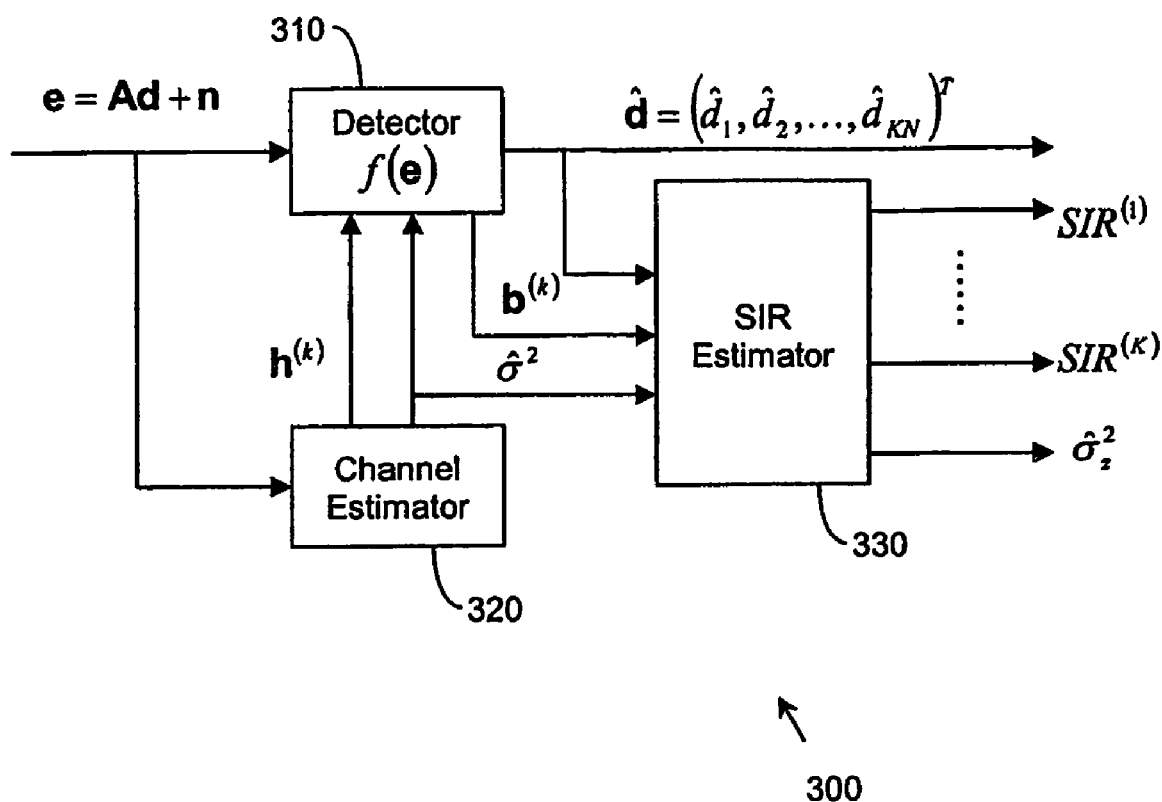
FIG. 3 shows a block schematic diagram illustrating a detector arrangement incorporating a noise variance and SIR estimator utilising the present invention.

Referring now to FIG. 3, in detector arrangement 300 (which may be used in Node B 122 or User Equipment 118) a new technique for estimating the SIR at the output of a detector 310 uses an estimate of the detector input noise variance (derived in channel estimator 320) to provide an estimate of the detector output noise variance (derived in SIR estimator 330). In the channel estimator 320 the detector input noise variance is derived from the midamble portion of the burst using locally reconstructed replicas of the transmitted signal which are removed from the received set of samples providing a residual term that contains the noise of the channel. In the SIR estimator 330, by deriving the transfer function of the detector an estimate of the detector output noise variance is estimated.

The estimated output noise variance then allows an improved estimate of the SIR ($SIR^{(1)} \ldots SIR^{(k)}$) at the detected output. Typically, the SIR at the output of the detector is used for deriving soft decision quantisation levels for application to channel decoding algorithms.

In the following description, two types of CDMA (Code Division Multiple Access) detector are considered, namely single user detector (SUD) and multiuser detector (MUD). It will be understood that the invention is also applicable to other types of detector such as a RAKE receiver.

The technique described here is based on first estimating the noise variance at the input to the detector and then mapping the input noise variance to the output noise variance using the transfer function of the detector.

The process of estimating the noise variance at the input to the detector is carried out using the midamble portion of the burst. Considering the received sequence of chip spaced samples $e=(e_1, e_2, \ldots, e_{L_B})^T$, where $L_B$ is the burst length, a locally reconstructed version for the midamble portion of the burst is defined as follows:

$$\overline{e} = (\overline{e}_1, \overline{e}_2, \ldots, \overline{e}_{L_m+W-1})^T = \left(\sum_k (h^{(k)} * m^{(k)})\right)^T$$

where denotes locally reconstructed version and $m^{(k)}$ is the midamble sequence of the $k^{th}$ user. The noise variance estimate at the input to the detector is given by $$\hat{\sigma}^2 = E(|(e_W, e_{W+1}, \ldots, e_X) - (\overline{e}_W, \overline{e}_{W+1}, \ldots, \overline{e}_X)|^2)$$

where $X \leq L_m$ and the starting position is W since the first W−1 samples from the midamble portion of the burst are corrupted by the data portion of the burst.

Multiuser Detection

Under the assumption that the noise is white with variance $\sigma^2$, the Minimum Mean Squared Error (MMSE) block linear equalizer solution to symbol estimation is given (as known from the publication of Klein, Kaleh and Baier entitled 'Zero Forcing and Minimum Mean-Square-Error Equalization for Mutliuser Detection in Code-Division Multiple-Access Channels' in IEEE Trans VT, VOL. 45, No. 2, May 1996, pp276-287) by $$\hat{d} = (A^H A + \sigma^2 I)^{-1} A^H e = f(e) = r + z$$

where I is the identity matrix and $$r = (A^H A + \sigma^2 I)^{-1} A^H A d = (r_1, r_2, \ldots r_{KN})^T \quad (1)$$

$$z = (A^H A + \sigma^2 I)^{-1} A^H n = (z_1, z_2, \ldots, z_{KN})^T \quad (2)$$

From equation (2), the noise variance seen at the output of the MUD is given by $$\sigma_z^2 = E(|z_{n+(k-1)Q}|^2) = (\|b^{(k)}\|^2 + \sigma^2)^{-3} \|b^{(k)}\|^2 \sigma^2$$

where $\|.\|$ denotes vector norm, and $\sigma^2$ represents the noise variance at the input of the MUD. By replacing $\sigma^2$ with the estimate of the MUD input noise variance $\hat{\sigma}^2$, we have a direct method for estimating the MUD output noise variance $\hat{\sigma}_z^2$.

For completeness, the estimate $\hat{\sigma}_z^2$ of the MUD output noise variance can be written as $$\hat{\sigma}_z^2 = f(\hat{\sigma}^2) = (\|b^{(k)}\|^2 + \hat{\sigma}^2)^{-2} \|b^{(k)}\|^2 \hat{\sigma}^2$$

where $f(\hat{\sigma}^2)$ represents the noise transfer function of the detector.

Using the new estimate for the output noise variance, the SIR at the output of the MUD for the $k^{th}$ sequence is defined by $$SIR^{(k)} = \frac{E(|r_{n+(k-1)Q}|^2) + \delta(\hat{\sigma}^2)}{\hat{\sigma}_z^2}$$

where the error term $\delta(\hat{\sigma}^2)$ is given by $$\delta(\hat{\sigma}^2) = \|b^{(k)}\|^2 \left(\frac{\sigma^2}{(\|b^{(k)}\|^2 + \sigma^2)^2} - \frac{\hat{\sigma}^2}{(\|b^{(k)}\|^2 + \hat{\sigma}^2)^2}\right)$$

It is clear from the above set of equations that when $\hat{\sigma}^2 = \sigma^2$ we have the following $$SIR^{(k)} = \frac{E(|r_{n+(k-1)Q}|^2)}{\sigma_z^2}$$

It will therefore be understood that the accuracy of the above technique is directly related to the quality of the noise variance estimate, $\hat{\sigma}^2$, at the input of the MUD.

Single User Detection

For the single user detector case the received sequence is written as $$e = Ad + n = HCd + n$$

The matrix H has dimensions $(NQ+W-1) \times NQ$ and its elements are given by $$H_{i,v} = \begin{cases} h_{i-v+1} & 1 \leq i-v+1 \leq W \\ 0 & \text{else} \end{cases}$$

where $h = (h_1, h_2, \ldots, h_W)^T$, $i=1, \ldots, NQ+W-1$, and $v=1, \ldots, NQ$. The matrix C has dimensions $NQ \times KN$ and its elements are given by $$C_{Q(n-1)+q, N(k-1)+n} = \begin{cases} c_q^{(k)} & q=1, \ldots, Q, n=1, \ldots, N, k=1, \ldots, K \\ 0 & \text{else} \end{cases}$$

For Minimum Mean Squared Error (MMSE) symbol estimation and under the assumption that the noise is white with variance $\sigma^2$, the output of the SUD is given by $$\hat{d} = C^H (H^H H + \sigma^2 I)^{-1} H^H e = f(e) = r + z$$

where $$r = C^H (H^H H + \sigma^2 I)^{-1} H^H H C d = (r_1, r_2, \ldots r_{KN})^T \quad (3)$$

$$z = C^H (H^H H + \sigma^2 I)^{-1} H^H n = (z_1, z_2, \ldots, z_{KN})^T \quad (4)$$

From equation (4), the noise variance seen at the output of the SUD is given by $$\sigma_z^2 = E(|z_{n+(k-1)Q}|^2) = G \times (\|h\|^2 + \sigma^2)^{-2} \|h\|^2 \sigma^2$$

where $\|.\|$ denotes vector norm, the multiplier G comes from the matrix C, and in general $G = \|c^{(k)}\|^2 = Q$.

By replacing $\sigma^2$ with the estimate of the SUD input noise variance $\hat{\sigma}^2$, we have a direct method for estimating the SUD output noise variance $\sigma_z^2$. For completeness, the estimate $\hat{\sigma}_z^2$ of the SUD output noise variance can be written as $$\hat{\sigma}_z^2 = f(\hat{\sigma}^2) = Q \times (\|h\|^2 + \hat{\sigma}^2)^{-2} \|h\|^2 \hat{\sigma}^2$$

where G is replaced with Q and $f(\hat{\sigma}^2)$ is the noise transfer function of the detector. Using the new estimate for the output noise variance, the SIR at the output of the SUD for the $k^{th}$ sequence is defined by $$SIR^{(k)} = \frac{E(|r_{n+(k-1)Q}|^2) + \delta(\hat{\sigma}^2)}{\hat{\sigma}_z^2}$$

where the error term $\delta(\hat{\sigma}^2)$ is given by $$\delta(\hat{\sigma}^2) = Q \times \|h\|^2 \left( \frac{\sigma^2}{(\|h\|^2 + \sigma^2)^2} - \frac{\hat{\sigma}^2}{(\|h\|^2 + \hat{\sigma}^2)^2} \right)$$

It is clear from the above set of equations that when $\hat{\sigma}^2 = \sigma^2$ we have the following $$SIR^{(k)} = \frac{E(|r_{n+(k-1)Q}|^2)}{\sigma_z^2}$$

It will therefore be understood that the accuracy of the above technique is directly related to the quality of the noise variance estimate, $\hat{\sigma}^2$, at the input of the SUD.

It will be appreciated that the method described above for noise variance and SNIR estimation may be carried out in software running on a processor (not shown—e.g., in User Equipment such as 118 or a Node B such as 122), and that the software may be provided as a computer program element carried on any suitable data carrier (also not shown) such as a magnetic or optical computer disc.

It will be also be appreciated that the arrangement described above for noise variance and SNIR estimation may alternatively be carried out in hardware, for example in the form of an integrated circuit (not shown) such as an FPGA (Field Programmable Gate Array) or ASIC (Application Specific Integrated Integrated Circuit).

It will be understood that the method and arrangement for noise variance and SIR estimation described above provides the following advantages that the accuracy of this technique is not poor at low SIR, since it does not suffer from a bias term, nor does it require correction therefor using a look-up table. An additional advantage is that any increase in estimation variance resulting from bias correction may be avoided.

The invention claimed is:

1. A method for noise variance estimation of a detected signal, the method comprising:
   receiving a wireless signal and producing, from an input of the received wireless signal to a detector, a detected signal, wherein the detected signal is an output from the detector;
   producing, from the received wireless signal, a first noise variance signal representative of noise variance in the received wireless signal; and
   producing, from the detected signal and the first noise variance signal, a second noise variance signal representative of noise variance estimation of the detector in the received signal.

2. The method of claim 1, wherein the producing the second noise variance signal comprises applying a function equal to a transfer function of the detector to the first noise variance signal.

3. The method of claim 1, wherein the producing the first noise variance signal comprises deriving the first noise variance signal from a midamble portion of the received wireless signal.

4. The method of claim 1, further comprising:
   producing from the second noise variance signal and an estimate of total power at the detector output a signal-to-interference ratio (SIR) signal representative of SIR in the received wireless signal.

5. The method of claim 1, wherein the detector is a CDMA multi-user detector.

6. The method of claim 1, wherein the detector is a CDMA single-user detector.

7. The method of claim 1, wherein the detector comprises a CDMA RAKE receiver.

8. The method of claim 1, wherein the wireless signal is a UMTS air interface signal.

9. A user equipment capable of noise variance estimation of a detected signal, the user equipment comprising:
   a detector for receiving a wireless signal and outputting from an input of the received wireless signal, a detected signal;
   first noise variance logic for producing, from the received wireless signal, a first noise variance signal representative of noise variance in the received wireless signal; and
   second noise variance logic for producing, from the detected signal and the first noise variance signal, a second noise variance signal representative of noise variance estimation of the detector in the received signal.

10. The user equipment of claim 9, wherein the second noise variance logic is operable to apply a function equal to a transfer function of the detector to the first noise variance signal to produce the second noise variance signal.

11. The user equipment of claim 9, wherein the first noise variance logic is operable to derive the first noise variance signal from a midamble portion of the received wireless signal.

12. The user equipment of claim 9, further comprising:
   signal-to-interference ratio (SIR) estimation logic for producing from the second noise variance signal and an estimate of total power at the detector output an SIR signal representative of SIR in the received wireless signal.

13. The user equipment of claim 9, wherein the detector is a CDMA multi-user detector.

14. The user equipment of claim 9, wherein the detector is a CDMA single-user detector.

15. The user equipment of claim 9, wherein the detector comprises a CDMA RAKE receiver.

16. The user equipment of claim 9, wherein the received wireless signal is a UMTS air interface signal.

17. A base station capable of noise variance estimation of a detected signal, the base station comprising:
   a detector for receiving a wireless signal and outputting, from an input of the received wireless signal, a detected signal;

first noise variance logic for producing, from the received wireless signal, a first noise variance signal representative of noise variance in the received wireless signal; and second noise variance logic for producing, from the detected signal and the first noise variance signal a second noise variance signal representative of noise variance estimation of the detector in the received signal.

18. The base station of claim 17, wherein the second noise variance logic is operable to apply a function equal to a transfer function of the detector to the first noise variance signal to produce the second noise variance signal.

19. The base station of claim 17, wherein the first noise variance logic is operable to derive the first noise variance signal from a midamble portion of the received wireless signal.

20. The base station of claim 17, further comprising:

SIR estimation logic for producing from second noise variance signal and an estimate of total power at the detector output an SIR signal representative of SIR in the received wireless signal.

21. The base station of claim 17, wherein the detector is a CDMA multi-user detector.

22. The base station of claim 17, wherein the detector is a CDMA single-user detector.

23. The base station of claim 17, wherein the detector comprises a CDMA RAKE receiver.

24. The base station of claim 17, wherein the received wireless signal is a UMTS air interface signal.

25. A user equipment comprising:

a memory;

a processor coupled to the memory; and program code executable on the processor, the program code operable for:

receiving a wireless signal and producing, from an input of the received wireless signal to a detector, a detected signal, wherein the detected signal is an output from the detector;

producing, from the received wireless signal, a first noise variance signal representative of noise variance in the received wireless signal; and producing, from the detected signal and the first noise variance signal, a second noise variance signal representative of noise variance estimation of the detector in the received signal.

26. A base station comprising:

a memory;

a processor coupled to the memory; and program code executable on the processor, the program code operable for:

receiving a wireless signal and producing from an input of the received wireless signal to a detector, a detected signal, wherein the detected signal is an output from the detector;

producing from the received wireless signal, a first noise variance signal representative of noise variance in the received wireless signal; and producing from the detected signal and the first noise variance signal, a second noise variance signal representative of noise variance estimation of the detector in the received signal.

27. A computer-readable medium encoded with executable instructions for noise variance estimation of a detected signal, the instructions comprising instructions for:

receiving a wireless signal and producing from an input of the received wireless signal to a detector, a detected signal, wherein the detected signal is an output from the detector;

producing from the received wireless signal, a first noise variance signal representative of noise variance in the received wireless signal; and producing from the detected signal and the first noise variance signal, a second noise variance signal representative of noise variance estimation of the detector in the received signal.

28. The computer-readable medium of claim 27, wherein the instructions are further for:

applying a function equal to a transfer function of the detector to the first noise variance signal.

29. The computer-readable medium of claim 27, wherein the instructions are further for deriving the first noise variance signal from a midamble portion of the received wireless signal.

30. The computer-readable medium of claim 27, wherein the instructions are further for producing from the second noise variance signal and an estimate of total power at the detector output an SIR signal representative of SIR in the received wireless signal.

31. A communication system configured to provide for noise variance estimation of a detected signal, the communication system comprising:

a detector for receiving a wireless signal and outputting from an input of the received wireless signal, a detected signal;

first noise variance logic for producing, from the received wireless signal, a first noise variance signal representative of noise variance in the received wireless signal; and second noise variance logic for producing, from the detected signal and the first noise variance signal, a second noise variance signal representative of noise variance estimation of the detector in the received signal.

32. An integrated circuit for receiving a signal and detecting therein a detected signal, the integrated circuit comprising:

first noise variance logic or producing, from the received wireless signal, a first noise variance signal representative of noise variance in the received wireless signal; and second noise variance logic for producing, from the detected signal and the first noise variance signal, a second noise variance signal representative of noise variance estimation of the detector in the received signal.

* * * * *

UNITED STATES PATENT AND TRADEMARK OFFICE
CERTIFICATE OF CORRECTION

PATENT NO. : 7,590,388 B2 Page 1 of 1
APPLICATION NO. : 10/567317
DATED : September 15, 2009
INVENTOR(S) : Alan E. Jones and Nicholas W. Anderson It is certified that error appears in the above-identified patent and that said Letters Patent is hereby corrected as shown below:

Column 9, Claim 17, Line 5; change "variance signal" to -- variance signal, --

Signed and Sealed this

Thirtieth Day of March, 2010

David J. Kappos
*Director of the United States Patent and Trademark Office*